(12) United States Patent
Gugumus

(10) Patent No.: US 6,545,071 B1
(45) Date of Patent: *Apr. 8, 2003

(54) STABILIZER MIXTURES

(75) Inventor: François Gugumus, Allschwil (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 778 days.

(21) Appl. No.: 08/911,199

(22) Filed: Aug. 14, 1997

(30) Foreign Application Priority Data

Aug. 22, 1996 (EP) ............................. 96810557

(51) Int. Cl.⁷ .................. C08K 5/09; C08K 5/3437; C08K 5/3465
(52) U.S. Cl. .................. 524/100; 524/89; 524/102; 524/103; 524/399; 524/400
(58) Field of Search .................. 524/89, 103, 102, 524/100

(56) References Cited

U.S. PATENT DOCUMENTS

| 4,190,571 A | * | 2/1980 | Lai et al. ............... 524/100 |
| 4,356,307 A | * | 10/1982 | Kelkenberg et al. ........ 524/89 |
| 4,769,457 A | * | 9/1988 | Helwig et al. ............ 544/180 |
| 4,929,652 A | * | 5/1990 | Gugumus ................. 524/102 |
| 4,976,889 A | * | 12/1990 | Aumueller et al. ......... 524/103 |
| 5,037,870 A | | 8/1991 | Gugumus |
| 5,049,604 A | * | 9/1991 | Fujii et al. ............... 524/103 |
| 5,071,981 A | * | 12/1991 | Son et al. ............... 544/198 |
| 5,171,328 A | | 12/1992 | Trauth et al. ............. 8/402 |

FOREIGN PATENT DOCUMENTS

| EP | 172413 | 2/1986 |
| EP | 290388 | 11/1988 |
| EP | 468923 | 1/1992 |
| EP | 690094 | 1/1996 |
| GB | 2097408 | 11/1982 |
| GB | 2269819 | 2/1994 |
| GB | 2269819 A | * | 2/1994 |
| GB | 2293827 | 10/1996 |
| GB | 2316409 | 2/1998 |

OTHER PUBLICATIONS

Plastics Additives Handbook, R. Gächter and H. Müller, Eds., Hanser Publishers, 3rd Edition, pp. 176 and 191–192 (1990).

Gächter and H. Müller," Plastics Additives Handbook" 3rd Edition, pp. 647–659.

* cited by examiner

Primary Examiner—Peter Szekely
(74) Attorney, Agent, or Firm—Tyler A. Stevenson; Luther A. R. Hall

(57) ABSTRACT

A stabilizer mixture containing
A) for example at least one compound of the formula (I)

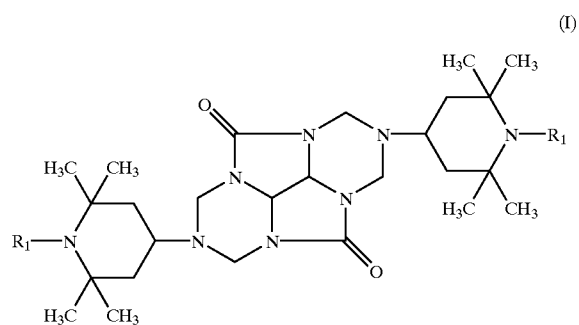

(I)

wherein the radicals $R_1$, independently of one another, are hydrogen, $C_1$–$C_8$alkyl, —O, —$CH_2CN$, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl; and B) magnesium oxide, magnesium hydroxide, zinc oxide, zinc hydroxide or an organic salt of zinc or magnesium, or a hydrotalcite; and C) either
(C1) an UV absorber or
(C2) a pigment or
(C3) an UV absorber and a pigment.

Such a stabilizer mixture is particularly useful for stabilizing a polyolefin against light-induced degradation.

14 Claims, No Drawings

STABILIZER MIXTURES

This invention relates to a stabilizer mixture containing A) a certain sterically hindered amine compound, B) a magnesium compound or a zinc compound and C) an UV absorber and/or a pigment, the use of this stabilizer mixture for stabilizing a polyolefin against light-induced degradation and the polyolefin thus stabilized.

Several stabilizer mixtures have already been described in the prior art, for example in U.S. Pat. Nos. 4,929,652, 5,037,870, EP-A-290 388, EP-A-468 923 and EP-A-690 094.

Although numerous stabilizer systems already exist, there is still a need to improve the light stability of polyolefin furthermore.

This invention relates to a stabilizer mixture containing

A) either (A1) at least one compound of the formula (I)

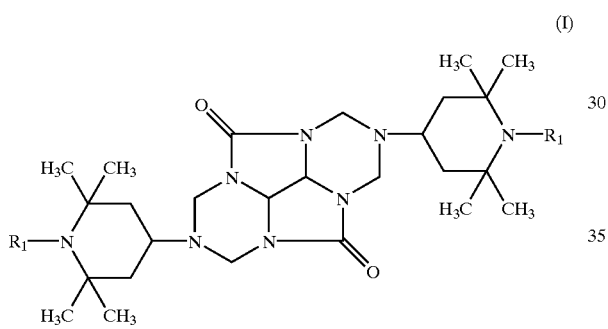

wherein the radicals $R_1$, independently of one another, are hydrogen, $C_1$–$C_8$alkyl, —O, —$CH_2CN$, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl; or (A2) at least one compound of the formula (II)

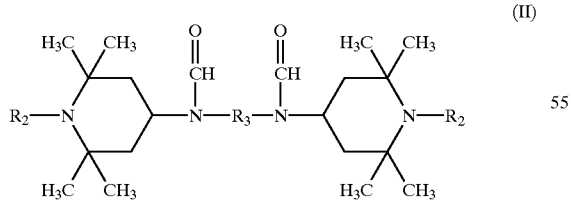

wherein
the radicals $R_2$, independently of one another, have one of the definitions given for $R_1$, and
$R_3$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene); or (A3) at least one compound of the formula (III)

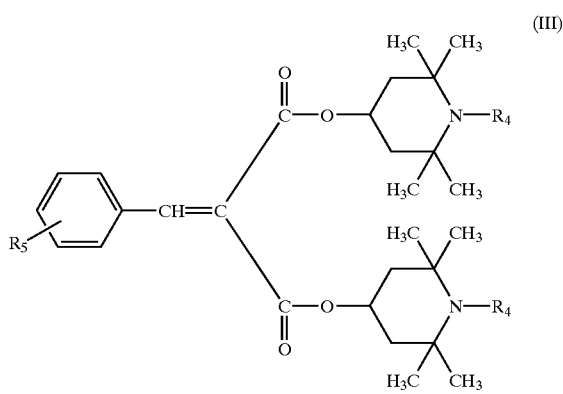

wherein
the radicals $R_4$, independently of one another, have one of the definitions given for $R_1$,
and $R_5$ is hydrogen, $C_1$–$C_{12}$alkyl or $C_1$–$C_{12}$alkoxy; or (A4) at least one compound of the formula (IV)

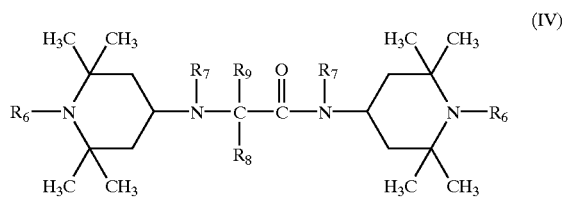

wherein the radicals $R_6$, independently of one another, have one of the definitions given for $R_1$,
the radicals $R_7$, independently of one another, are hydrogen or $C_1$–$C_4$alkyl, and
$R_8$ and $R_9$, independently of one another, are $C_1$–$C_{12}$alkyl; or (A5) at least one compound of the formula (V)

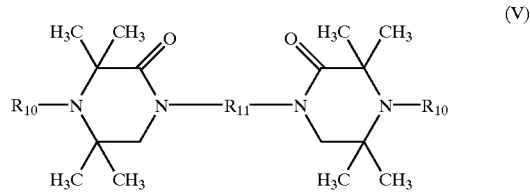

wherein
the radicals $R_{10}$, independently of one another, have one of the definitions given for $R_1$, and
$R_{11}$ is $C_2$–$C_{22}$alkylene; or (A6) at least one compound of the formula (VI)

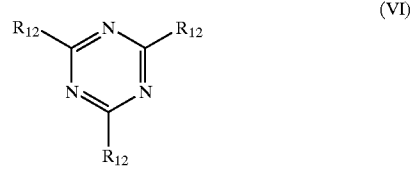

wherein $R_{12}$ is a group of the formula (VII)

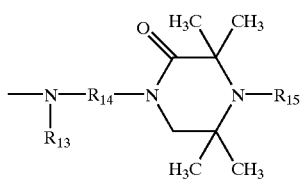

(VII)

in which
$R_{13}$ is $C_1$–$C_{12}$alkyl or $C_5$–$C_{12}$cycloalkyl,
$R_{14}$ is $C_2$–$C_{12}$alkylene, and
$R_{15}$ has one of the meanings given for $R_1$; or
(A7) at least one compound of the formula (VIII)

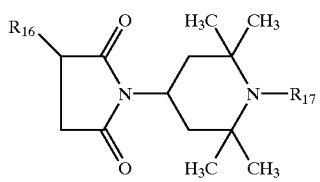

(VIII)

wherein
$R_{16}$ is $C_1$–$C_{24}$alkyl, and
$R_{17}$ has one of the definitions given for $R_1$; and
B) magnesium oxide, magnesium hydroxide, zinc oxide, zinc hydroxide or an organic salt of zinc or magnesium, or a hydrotalcite; and
C) either
  (C1) an UV absorber or
  (C2) a pigment or
  (C3) an UV absorber and a pigment.

Component B) is preferably magnesium oxide, magnesium hydroxide, zinc oxide, zinc hydroxide or an organic salt of zinc or magnesium.

When component A) is at least one compound of the formula I or IV, component B) is preferably magnesium oxide, magnesium hydroxide or an organic salt of zinc or magnesium, in particular an organic salt of zinc or magnesium.

Examples of alkyl having up to 24 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl.

A preferred embodiment of $R_1$, $R_2$, $R_4$, $R_6$, $R_{10}$, $R_{15}$ and $R_{17}$ is $C_1$–$C_4$alkyl, in particular methyl.

One of the preferred meanings of $R_5$, $R_7$, $R_8$, $R_9$ and $R_{13}$ is $C_1$–$C_8$alkyl, in particular $C_1$–$C_4$alkyl, for example methyl.

$R_{16}$ is preferably $C_1$–$C_{14}$alkyl, in particular $C_8$–$C_{14}$alkyl, for example docecyl.

Examples of $C_1$–$C_{12}$alkoxy are methoxy, ethoxy, propoxy, isopropoxy, butoxy, isobutoxy, pentoxy, isopentoxy, hexoxy, heptoxy, octoxy, decyloxy and dodecyloxy.

One of the preferred meanings of $R_5$ is $C_1$–$C_8$alkoxy, in particular $C_1$–$C_4$alkoxy, for example methoxy.

Examples of $C_5$–$C_{12}$cycloalkyl are cyclopentyl, cyclohexyl, cycloheptyl, cyclooctyl and cyclododecyl. $C_5$–$C_7$cycloalkyl, in particular cyclohexyl, is preferred.

Examples of $C_3$–$C_6$alkenyl are allyl, 2-methallyl, butenyl, pentenyl and hexenyl. Allyl is preferred. The carbon atom in position 1 is preferably saturated.

$C_7$–$C_9$Phenylalkyl which is unsubstituted or substituted by $C_1$–$C_4$alkyl on the phenyl radical is, for example, benzyl, phenylethyl, methylbenzyl, dimethylbenzyl, trimethylbenzyl or tert-butylbenzyl. Benzyl is preferred.

$C_1$–$C_8$acyl is preferably $C_1$–$C_8$alkanoyl, $C_3$–$C_8$alkenoyl or benzoyl. Examples are formyl, acetyl, propionyl, butyryl, pentanoyl, hexanoyl, octanoyl, benzoyl, acrylyl and crotonyl. Acetyl is preferred.

Examples of alkylene having up to 22 carbon atoms are ethylene, propylene, trimethylene, tetramethylene, pentamethylene, 2,2-dimethyltrimethylene, hexamethylene, trimethylhexamethylene, octamethylene, decamethylene, undecamethylene, tetradecamethylene, hexadecamethylene and octadecamethylene. $C_2$–$C_{10}$alkylene is preferred, in particular $C_2$–$C_6$alkylene, for example dimethylene and hexamethylene.

$R_3$ is preferably hexamethylene and $R_{11}$ and $R_{14}$ are preferably dimethylene.

An example of $C_5$–$C_7$cycloalkylene is cyclohexylene.

An example of $C_1$–$C_4$alkylenedi($C_5$–$C_7$cycloalkylene) is

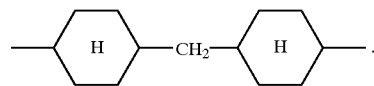

An example of phenylenedi($C_1$–$C_4$alkylene) is phenylenedimethylene.

The radical $R_5$ in the formula (III) is preferably in the para-position.

$R_1$, $R_2$, $R_4$, $R_6$, $R_{10}$, $R_{15}$ and $R_{17}$, independently of one another, are preferably hydrogen, $C_1$–$C_4$alkyl, allyl, benzyl or acetyl, in particular hydrogen or methyl.

The compounds described as component A) are essentially known (in some cases commercially available) and can be prepared by known processes, for example as described in U.S. Pat. Nos. 4,769,457, 4,976,889, GB-A-2 269 819, EP-A-172 413, U.S. Pat. Nos. 4,190,571, 5,071,981 and 4,356,307.

Component A) is preferably ®UVINUL 4049, ®UVINUL 4050 H, ®SANDUVOR PR-31, ®SUMISORB TM 61, ®GOODRITE UV 3034, ®GOODRITE UV 3150, ®GOODRITE UV 3159, ®CYASORB UV 3581 or ®SANDUVOR 3056.

A preferred embodiment of this invention relates to a stabilizer mixture wherein component A) is at least one compound of the formula (II), (III), (V), (VI) or (VIII).

Preferred stabilizer mixtures are those wherein
  $R_3$ is $C_2$–$C_{10}$alkylene, cyclohexylene, ($C_1$–$C_4$alkylene) dicyclohexylene, phenylene or phenylenedi ($C_1$–$C_4$alkylene),
  $R_5$ is hydrogen, $C_1$–$C_4$alkyl or $C_1$–$C_4$alkoxy,
  the radicals $R_7$, independently of one another, are hydrogen or $C_1$–$C_4$alkyl,
  $R_8$ and $R_9$, independently of one another, are $C_1$–$C_4$alkyl,
  $R_{11}$ is $C_2$–$C_{10}$alkylene,
  $R_{13}$ is $C_1$–$C_4$alkyl or cyclohexyl,
  $R_{14}$ is $C_2$–$C_{10}$alkylene and
  $R_{16}$ is $C_1$–$C_{14}$alkyl.

Particularly preferred stabilizer mixtures are those wherein component A) is a compound of the formula

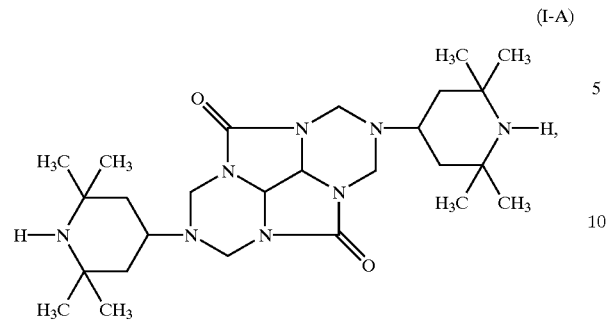
(I-A)

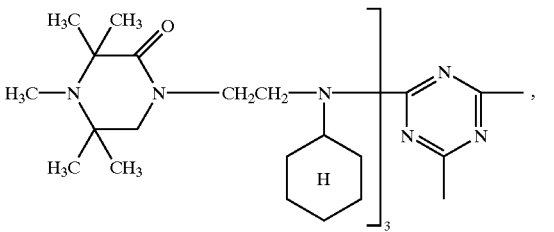
(VI-B)

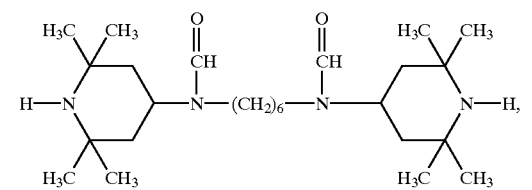
(II-A)

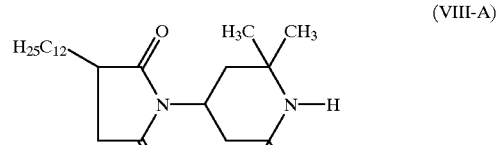
(VIII-A)

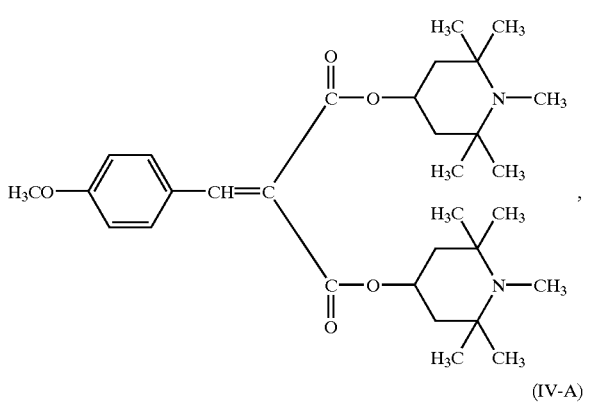
(III-A)

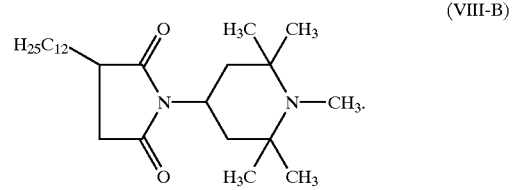
(VIII-B)

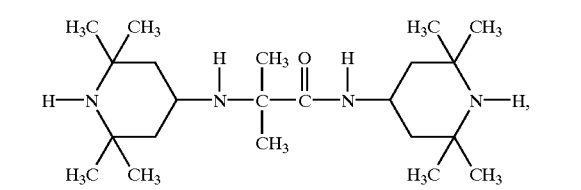
(IV-A)

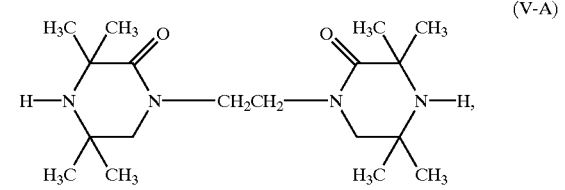
(V-A)

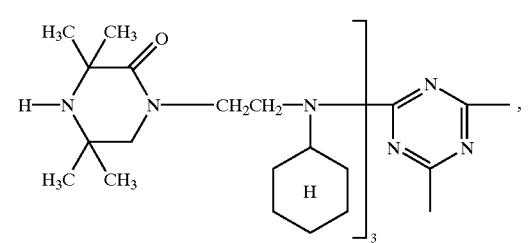
(VI-A)

The organic salt of zinc or magnesium defined in component B) is preferably a compound of the formula $MeL_2$ in which Me is zinc or magnesium and L is an anion of an organic acid or of an enol. The organic acid can, for example, be a sulfonic acid, sulfinic acid, phosphonic acid or phosphinic acid, but is preferably a carboxylic acid. The acid can be aliphatic, aromatic, araliphatic or cycloaliphatic; it can be linear or branched; it can be substituted by hydroxyl or alkoxy groups; it can be saturated or unsaturated and it preferably contains 1 to 24 carbon atoms.

Examples of carboxylic acids of this type are formic, acetic, propionic, butyric, isobutyric, caprioic, 2-ethylcaproic, caprylic, capric, lauric, palmitic, stearic, behenic, oleic, lactic, ricinoleic, 2-ethoxypropionic, benzoic, salicylic, 4-butylbenzoic, toluic, 4-dodecylbenzoic, phenylacetic, naphthylacetic, cyclohexanecarboxylic, 4-butylcyclohexanecarboxylic or cyclohexylacetic acid. The carboxylic acid can also be a technical mixture of carboxylic acids, for example technical mixtures of fatty acids or mixtures of alkylated benzoic acids.

Examples of organic acids containing sulfur or phosphorus are methanesulfonic, ethanesulfonic, α,α-dimethylethanesulfonic, n-butanesulfonic, n-dodecanesulfonic, benzenesulfonic, toluenesulfonic, 4-nonylbenzenesulfonic, 4-dodecylbenzenesulfonic or cyclohexanesulfonic acid, dodecanesulfinic, benzenesulfinic or naphthalenesulfinic acid, butylphosphonic acid, phenylphosphonic acid, monomethyl or monoethyl phenylphosphonate, monobutyl benzylphosphonate, dibutylphosphinic acid or diphenylphosphinic acid.

If L is an enolate anion, it is preferably an anion of a β-dicarbonyl compound or of an o-acylphenol. Examples of β-dicarbonyl compounds are acetylacetone, benzoylacetone, dibenzoylmethane, ethyl acetoacetate, butyl acetoacetate, lauryl acetoacetate or α-acetylcyclohexanone. Examples of o-acylphenols are 2-acetylphenol, 2-butyroylphenol, 2-acetyl-1-naphthol, 2-benzoylphenol or salicylaldehyde.

The enolate is preferably the anion of a β-dicarbonyl compound having 5 to 20 carbon atoms.

Preferred examples of component B) are magnesium acetate, laurate and stearate, zinc formate, acetate, oenanthate, laurate and stearate and zinc acetylacetonate and magnesium acetylacetonate.

In a preferred embodiment of this invention component B) as an organic salt of zinc or magnesium is preferably an acetylacetonate or an aliphatic monocarboxylate having, for example, 1 to 24 carbon atoms.

A preferred hydrotalcite is $Mg_{4.5}Al_2(OH)_{13}.CO_3.3.5\ H_2O$ (®DHT-4A, ®Kyowa Chemical Industries Co. Ltd.).

The UV absorber in component C) is preferably a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

The 2-(2'-hydroxyphenyl)benzotriazole is for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl -5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotrazole, 2-(3'-tertbutyl -2'-hydroxy-5'-(2-methoxycarbonylethyl)phenyl)benzotriazole, 2-(3'-tert-butyl-2'-hydroxy -5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300;, where R=3'-tert-butyl-4'-hydroxy-5'-2H-benzotriazol-2-ylphenyl.

2-(3',5'-Di-tert-butyl-2'-hydroxyphenyl)-5-chloro-benzotriazole, 2-(3'-tert-butyl-2'-hydroxy-5'-methylphenyl)-5-chloro-benzotriazole and 2-(3',5'-di-tert-amyl-2'-hydroxyphenyl)-benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl α-cyano-β,β-diphenylacrylate, isooctyl α-cyano-β,β-di-phenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate or N-(β-carbomethoxy-β-cyanovinyl)-2-methylindoline.

The oxamide is for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxy-disubstituted oxanilides or mixtures of o- and p-ethoxy-disubstituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine or 2-(2-hydroxyphenyl)-4-(4-methoxyphenyl)-6-phenyl-1,3,5-triazine.

2-(2-Hydroxy-4-octyloxyphenyl)-4,6-bis(2,4-dimethylphenyl)-1,3,5-triazine and 2-(2-hydroxy-4-hexyloxy)phenyl-4,6-diphenyl-1,3,5-triazine are preferred.

The monobenzoate of resorcinol is for example the compound of the formula

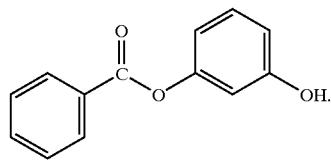

The formamidine is for example the compound of the formula

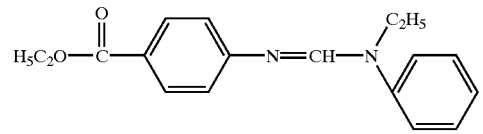

The UV absorber in component C) is in particular a 2-(2'-hydroxyphenyl)benzotriazole, a 2-hydroxybenzophenone or a 2-(2-hydroxyphenyl)-1,3,5-triazine.

Component C) is preferably an UV absorber.

The pigment in component C) may be an inorganic or organic pigment.

Examples of inorganic pigments are titanium dioxide, zinc oxide, carbon black, cadmium sulfide, cadmium selenide, chromium oxide, iron oxide, lead oxide and so on.

Examples of organic pigments are azo pigments, anthraquinones, phthalocyanines, tetrachloroisoindolinones, quinacridones, isoindolines, perylenes, pyrrolopyrroles (such as Pigment Red 254) and so on.

As a pigment in component C), all pigments described in "Gächter/Müller: Plastics Additives Handbook, 3rd Edition, Hanser Publishers, Munich Vienna New York", page 647 to 659, point 11.2.1.1 to 11.2.4.2 can be used.

A particular preferred pigment is titanium dioxide.

A further preferred embodiment of this invention is a stabilizer mixture containing
A) a compound of the formula (I-A), (II-A), (III-A), (IV-A), (V-A), (VI-A), (VI-B), (VIII-A) or (VIII-B),
B) magnesium stearate or zinc stearate and
C) the compound

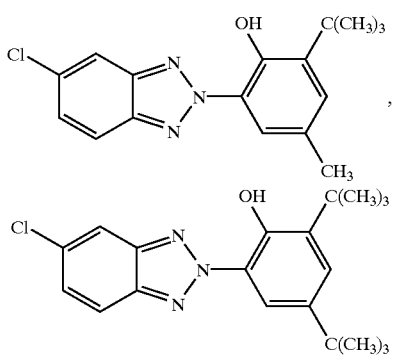

or $TiO_2$.

The stabilizer mixture according to the present invention is useful for stabilizing polyolefins. Examples of suitable polyolefins are shown in the following.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:
a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The invention therefore furthermore relates to a composition containing a polyolefin and the novel stabilizer mixture.

The polyolefins listed above under point 1 are preferred. Polyethylene and polypropylene as well as a copolymer of polyethylene or polypropylene are particularly preferred.

The components of the novel stabilizer mixture can be added to the material to be stabilized either individually or mixed with one another. Component (A) is preferably present in an amount of 0.01 to 5%, in particular 0.05 to 1%; component (B) is preferably present in an amount of 0.005 to 1%, in particular 0.025 to 0.2%; component (C1) is preferably present in an amount of 0.01 to 1%, component (C2) is preferably present in an amount of 0.01 to 10% and component (C3) is preferably present in an amount of 0.01 to 10%. "%" is % by weight, relative to the material to be stabilized.

The ratio of the UV absorber to the pigment in component (C3) is preferably 2:1 to 1:10.

The ratio of the components (A):(B) is preferably 30:1 to 1:30, for example 20:1 to 1:20 or 20:1 to 1:10.

The ratio of the components (A):($C_1$) is preferably 1:20 to 30:1, for example 1:10 to 20:1 or 1:5 to 20:1.

The ratio of the components (A):($C_2$) is preferably 1:30 to 30:1, for example 1:20 to 20:1 or 1:10 to 10:1.

The ratio of the components (A):($C_3$) is preferably 1:30 to 30:1, for example 1:20 to 20:1 or 1:10 to 10:1.

The novel stabilizer mixture or the individual components thereof can be incorporated into the polyolefin by known methods, for example before or during shaping or by applying the dissolved or dispersed compounds to the polyolefin, if necessary with subsequent evaporation of the solvent. The individual components of the novel stabilizer mixture can be added to the materials to be stabilized in the form of a powder, granules or a masterbatch, which contains these components in, for example, a concentration of from 2.5 to 25% by weight.

If desired, the components of the novel stabilizer mixture can be melt blended with each other before incorporation in the polyolefin.

The novel stabilizer mixture or its components can be added before or during the polymerization or before the crosslinking.

The materials stabilized in this way can be used in a wide variety of forms, for example as films, fibres, tapes, moulding compositions, profiles or as binders for paints, adhesives or putties.

The stabilized polyolefin of the invention may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl) pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tis(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl) isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N', N'-tetramethyl-4,4'-diaminodiphenylmethane, 1,2-bis[(2-methylphenyl)amino]ethane, 1,2-bis (phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N', N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and Light Stabilisers 2.1 Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.2 Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butyl-benzyl)malonate, 3-n-octyl-7,7,9,9-tetramethyl-1,3,8-triazaspiro[4.5]decan-2,4-dion, bis(1-octyloxy-2,2,6,6-tetramethylpiperidyl)sebacate, bis(1-octyloxy-2,2,6,6-tetramethylpiperidyl)succinate, the condensate of N,N'-bis-(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6- tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)-oxalyl dihydrazide, oxanilide, isophthaloyl dihydrazide, sebacoyl bisphenylhydrazide, N,N'-diacetyladipoyl dihydrazide, N,N'-bis (salicyloyl)oxalyl dihydrazide, N,N'-bis(salicyloyl) thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl)4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methylphosphite, bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

The weight ratio of the total amount of components A), B) and C) to the conventional additives can be, for example, from 1:0.1 to 1:5.

The invention furthermore relates to the use of the novel stabilizer mixture for stabilizing a polyolefin against light-induced degradation.

The examples below illustrate the invention in greater detail. All percentages and parts are by weight, unless stated otherwise.

Stabilizers Used in Examples 1 and 2:

Compound (I-A):

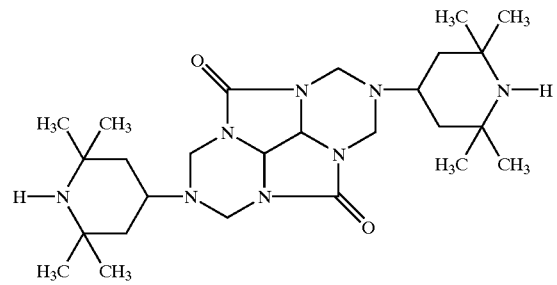

Compound (II-A):

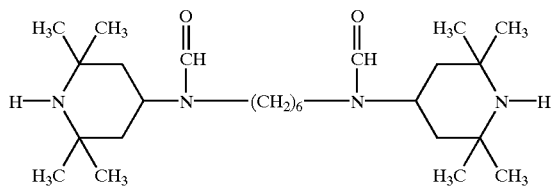

Compound (III-A):

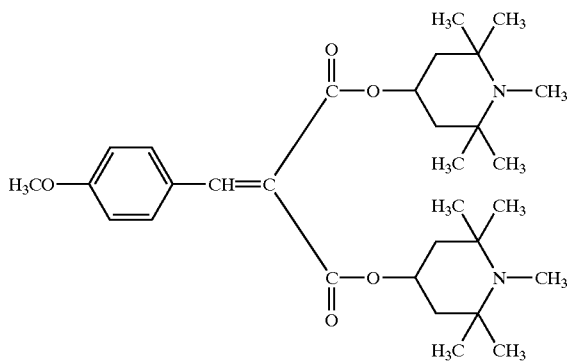

Compound (V-A):

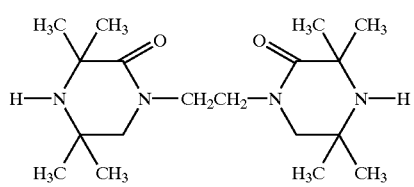

Compound (VI-A):

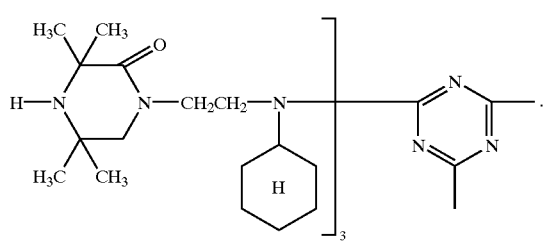

Compound (VI-B):

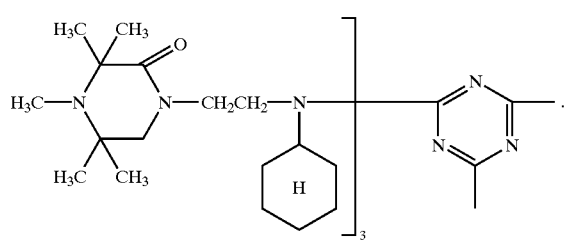

Compound (VIII-A):

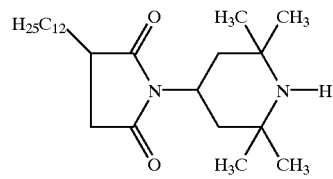

Compound (VIII-B):

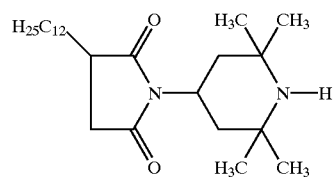

Compound (XX):

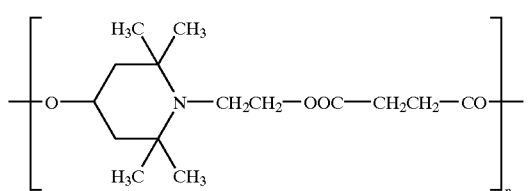

The mean value of n is 5.1.

Compound (C):

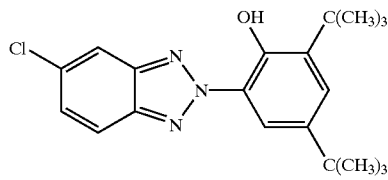

EXAMPLE 1

Light stabilization in polypropylene homopolymer films. 100 parts of polypropylene homopolymer powder are homogenized with 0.05 part of pentaerythrityl tetrakis[3-(3,5-di-tert-butyl-4-hydroxyphenyl)propionate], 0.05 part of tris(2,4-di-tert-butylphenyl)phosphite and with the stabilizers indicated in Tables 1 and 2 in a Brabender plastograph at 200° C. for 10 minutes. The composition thus obtained is removed from the compounder as rapidly as possible and compressed in a toggle press to give a sheet with a thickness of 2–3 mm. A piece of the resultant press-moulding is cut out and pressed between two high-gloss hard aluminium foils for 6 minutes at 260° C. using a laboratory hydraulic press to give a film with a thickness of 0.5 mm, which is immediately cooled in a water-cooled press. Sections each measuring 60 mm×25 mm are then punched out of this 0.5 mm film and are exposed in a WEATHER-OMETER Ci 65 (black panel temperature 63±2° C., without water-spraying). These test specimens are removed from the exposure apparatus at regular intervals and tested for their carbonyl content in an IR spectrometer. The increase in the carbonyl extinction on exposure is a measure of the photooxidative degradation of the polymer and is known from experience to be associated with a deterioration in the mechanical properties.

The time ($T_{0.1\ measured}$) needed to reach a carbonyl extinction of 0.1 is shown in Tables 1 and 2.

TABLE 1

Light stabilization action in polypropylene homopolymer films.

| Light stabilizer | $T_{0.1}$ measured in hours |
|---|---|
| 0.05% of (I-A), 0.1% of magnesium stearate and 0.1% of (C) | 1830 |
| 0.05% of (II-A), 0.1% of magnesium stearate and 0.1% of (C) | 1690 |
| 0.05% of (III-A), 0.1% of magnesium stearate and 0.1% of (C) | 1840 |
| 0.05% of (V-A), 0.1% of magnesium stearate and 0.1% of (C) | 2880 |
| 0.05% of (VI-A), 0.1% of magnesium stearate and 0.1% of (C) | 2060 |
| 0.05% of (VI-B), 0.1% of magnesium stearate and 0.1% of (C) | 2180 |
| 0.05% of (VIII-A), 0.1% of magnesium stearate and 0.1% of (C) | 2700 |
| 0.05% of (VIII-B), 0.1% of magnesium stearate and 0.1% of (C) | 2320 |
| Comparison: Stabilizer mixture according to US-A-4 929 652 0.05% of (XX), 0.1% of magnesium stearate and 0.1% of (C) | 1620 |

TABLE 2

Light stabilization action in polypropylene homopolymer films.

| Light stabilizer | $T_{0.1}$ measured in hours |
|---|---|
| 0.05% of (I-A), 0.1% of zinc stearate and 0.5% of TiO$_2$ (rutile) | 1840 |
| 0.05% of (II-A), 0.1% of zinc stearate and 0.5% of TiO$_2$ (rutile) | 1740 |
| 0.05% of (III-A), 0.1% of zinc stearate and 0.5% of TiO$_2$ (rutile) | 1720 |
| 0.05% of (V-A), 0.1% of zinc stearate and 0.5% of TiO$_2$ (rutile) | 3140 |
| 0.05% of (VI-A), 0.1% of zinc stearate and 0.5% of TiO$_2$ (rutile) | 1940 |
| 0.05% of (VI-B), 0.1% of zinc stearate and 0.5% of TiO$_2$ (rutile) | 1710 |
| 0.05% of (VIII-A), 0.1% of zinc stearate and 0.5% of TiO$_2$ (rutile) | 2700 |
| 0.05% of (VIII-B), 0.1% of zinc stearate and 0.5% of TiO$_2$ (rutile) | 2560 |
| Comparison: Stabilizer mixture according to US-A-4 929 652 0.05% of (XX), 0.1% of zinc stearate and 0.5% of TiO$_2$ (rutile) | 1230 |

EXAMPLE 2

Light stabilization in polypropylene block copolymer films. 100 parts of polypropylene block copolymer powder are homogenized with 0.05 part of pentaerythrityl tetrakis [3-(3,5-di-tert-butyl-4-hydroxyphenyl)propionate], 0.10 part of tris(2,4-di-tert-butylphenyl)phosphite and with the stabilizer mixture indicated in Table 3 in a Brabender plastograph at 200° C. for 10 minutes. The composition thus obtained is removed from the compounder as rapidly as possible and compressed in a toggle press to give a sheet with a thickness of 2–3 mm. A piece of the resultant press-moulding is cut out and pressed between two high-gloss hard aluminium foils for 6 minutes at 260° C. using a laboratory hydraulic press to give a film with a thickness of 0.5 mm, which is immediately cooled in a water-cooled press. Sections each measuring 60 mm×25 mm are then punched out of this 0.5 mm film and are exposed in a WEATHER-OMETER Ci 65 (black panel temperature 63±2° C., without water-spraying). These test specimens are removed from the exposure apparatus at regular intervals and tested for their carbonyl content in an IR spectrometer. The increase in the carbonyl extinction on exposure is a measure of the photooxidative degradation of the polymer and is known from experience to be associated with a deterioration in the mechanical properties.

The time ($T_{0.1\ measured}$) needed to reach a carbonyl extinction of 0.1 is shown in Table 3.

TABLE 3

| Stabilizer mixture | $T_{0.1}$ measured in hours |
|---|---|
| 0.05% of (II-A), 0.1% of magnesium stearate and 0.1% of (C) | 4720 |
| 0.05% of (VIII-A), 0.1% of magnesium stearate and 0.1% of (C) | 6760 |
| 0.05% of (VIII-B), 0.1% of magnesium stearate and 0.1% of (C) | 5840 |
| Comparison: Stabilizer mixture according to US-A-4 929 652 0.05% of (XX), 0.1% of magnesium stearate and 0.1% of (C) | 4400 |

What is claimed is:

1. A stabilizer mixture containing
    A) either
        (A5) at least one compound of the formula (V)

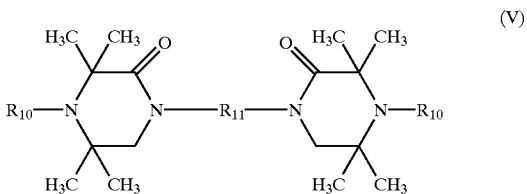

(V)

wherein the radicals $R_{10}$, independently of one another are hydrogen, $C_1$–$C_8$alkyl, —O, —CH$_2$CN, $C_3$–$C_6$alkenyl, $C_7$–$C_9$phenylalkyl, $C_7$–$C_9$phenylalkyl which is substituted on the phenyl radical by $C_1$–$C_4$alkyl; or $C_1$–$C_8$acyl; and
    $R_{11}$ is $C_2$–$C_{22}$alkylene; or
        (A7) at least one compound of the formula (VIII)

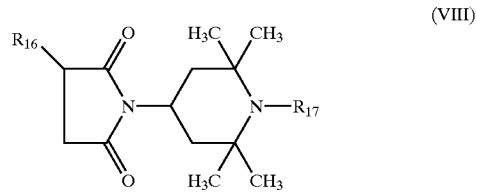

(VIII)

wherein $R_{16}$ is $C_1$–$C_{24}$alkyl, and
    $R_{17}$ has one of the definitions given for $R_{10}$; and
    B) an organic salt of zinc or magnesium; and
    C) either
        (C1) an UV absorber or
        (C2) a pigment or
        (C3) an UV absorber and a pigment.
2. A stabilizer mixture according to claim 1 wherein component A) is a compound of the formula (V) or (VIII).
3. A stabilizer mixture according to claim 1 wherein the radicals $R_{10}$ and $R_{17}$, independently of one another, are hydrogen, $C_1$–$C_4$alkyl, allyl, benzyl or acetyl.

4. A stabilizer mixture according to claim 1 wherein the radicals $R_{10}$ and $R_{17}$, independently of one another, are hydrogen or methyl.

5. A stabilizer mixture according to claim 1 wherein
$R_{11}$ is $C_2$–$C_{10}$alkylene and
$R_{16}$ is $C_1$–$C_{14}$alkyl.

6. A stabilizer mixture according to claim 1 wherein component A) is a compound of the formula

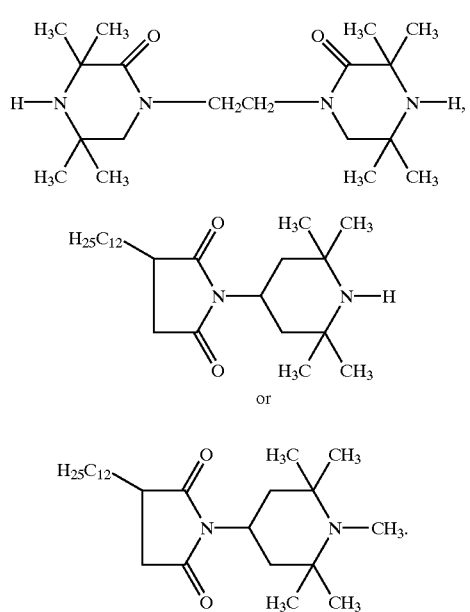

7. A stabilizer mixture according to claim 1 wherein the organic salt of zinc or magnesium is an acetylacetonate or an aliphatic monocarboxylate and wherein the UV absorber is a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

8. A stabilizer mixture according to claim 1 wherein the UV absorber is a 2-(2'-hydroxyphenyl)benzotriazole, a 2-hydroxybenzophenone or a 2-(2-hydroxyphenyl)-1,3,5-triazine.

9. A stabilizer mixture according to claim 1 wherein the pigment is titanium dioxide.

10. A stabilizer mixture according to claim 1, containing as component C) an UV absorber.

11. A stabilizer mixture according to claim 6 wherein component B) is magnesium stearate or zinc stearate and component C) is the compound

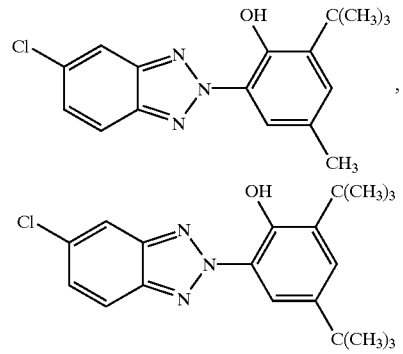

or $TiO_2$.

12. A composition containing a polyolefin and a stabilizer mixture according to claim 1.

13. A composition according to claim 12 wherein the polyolefin is polyethylene or polypropylene or a copolymer of polyethylene or polypropylene.

14. A method for stabilizing a polyolefin against light-induced degradation, which comprises adding to the polyolefin a stabilizer mixture according to claim 1.

* * * * *